US005360620A

United States Patent [19]

Hsu

[11] Patent Number: 5,360,620

[45] Date of Patent: Nov. 1, 1994

[54] METHOD FOR WETTING AND DISSOLVING DRY PARTICLES

[75] Inventor: Sheng H. Hsu, Marysville, Ohio

[73] Assignee: Nestec S.A., Vevey, Switzerland

[21] Appl. No.: 88,957

[22] Filed: Jul. 12, 1993

Related U.S. Application Data

[62] Division of Ser. No. 852,054, Mar. 16, 1992, Pat. No. 5,253,578.

[51] Int. Cl.[5] .............. A23F 51/00

[52] U.S. Cl. .............. 426/432; 99/275; 210/326; 210/402; 210/784; 366/292; 366/300; 426/506; 426/594; 426/595

[58] Field of Search .............. 99/275; 426/432, 506, 426/594, 595; 210/259, 260, 386, 402, 525, 767, 784, 326; 366/154, 165, 167, 168, 172, 177, 187, 290, 292, 297, 300

[56] References Cited

U.S. PATENT DOCUMENTS

| | | | |
|---|---|---|---|
| 4,242,204 | 12/1980 | Stigebrandt | 210/326 |
| 4,534,985 | 8/1985 | Gasau | 426/432 |
| 5,229,155 | 7/1993 | Weisemann et al. | 426/432 |

*Primary Examiner*—Robert A. Dawson

*Assistant Examiner*—David Reifsnyder

[57] ABSTRACT

This invention is directed to an apparatus and method for wetting and dissolving finely divided dry particles, including hygroscopic particles such as coffee fines, in a liquid, including viscous liquids such as concentrated coffee liquor, in a manner in which foaming, the presence of wet lumps and liquor degradation are minimized. The apparatus includes a dissolving tank containing at least one pair of counter-rotating drums partially submerged in a body of the dissolving liquid. The tank includes a liquid inlet and a discharge conduit which maintain a predetermined level of liquid in the tank. A powder feeding device mounted above the tank discharges a falling curtain of particles onto a thin layer of liquid on the surface of one of the drums in each counter-rotating pair. The partially wetted powder is carried into the nip between the counter-rotating drums to compress, knead and break up wet lumps of partially wetted powder formed on the surface of the drums, with the wetted powder being carried into and dissolved in the body of liquor. Continued rotation of the drums carries any wet powder lumps which may remain in the liquor into the converging gap between the drum and a tangentially mounted solubilizing bar to abrade and disintegrate the lumps in the liquor body.

5 Claims, 1 Drawing Sheet

METHOD FOR WETTING AND DISSOLVING DRY PARTICLES

This is a division of co-pending application Ser. No. 07/852,054 filed Mar. 16, 1992 U.S. Pat. No. 5,253,578.

This invention relates to an apparatus and method for wetting and dissolving dry particles in a liquid. More particularly, the invention relates to an apparatus and method to wet and dissolve coffee particles, including finely divided coffee powder, in low temperature coffee liquor in a manner which increases the solids content of the coffee liquor while minimizing lumping, foaming and coffee quality degradation.

BACKGROUND OF THE INVENTION

In the production of soluble coffee, a significant amount of commercially unacceptable dried coffee particles are produced. For example, conventional drying procedures, such as spray drying and freeze drying, result in the production of significant amounts of coffee fines, which typically have a particular size of less than about 0.5 mm, and are commercially undesirable. Such coffee fines usually are reprocessed so that while they are not included in commercial soluble coffee products, they are recovered to improve the economics of the production operation. That is, the coffee fines typically are added back to coffee liquor being processed in order to wet and dissolve the coffee particles in the liquor and thereby increase the total soluble solids level of the coffee liquor, which is recycled to the drying operation. However, because of their small particle size and hygroscopic character the coffee fines, when added to coffee liquor or other aqueous media, are difficult to wet and dissolve. The fine hygroscopic particles when contacted with coffee liquor or other aqueous media do not disperse but tend to form wet lumps having a gummy exterior surface and undissolved powder on the inside. In the past it has usually been necessary to heat the coffee liquor to an elevated temperature of about 90° C. in order to effect wetting and dissolution of the fines in the viscous coffee liquor. However, heating of the coffee liquor to such elevated temperatures is detrimental to the quality of the resulting soluble coffee product. In addition, even with such heating, complete dissolution of the coffee fines could rarely be achieved in commercial operations due to the inability to break up and dissolve all of the lumps. Moreover, the addition of coffee fines to coffee liquor or other aqueous media tends to cause undesirable foaming due to the incorporation of entrained air. Consequently the apparatus and procedures which have been used heretofore for reprocessing coffee fines in concentrated coffee liquor have tended to produce very foamy, partially dissolved solutions containing relatively large amounts of wet powder lumps.

SUMMARY OF THE INVENTION

The present invention is directed to an apparatus and method for wetting and dissolving hygroscopic particles, such as dried coffee granules or fines, in an aqueous medium, particularly concentrated coffee liquor. The apparatus includes a dissolving tank having a liquor supply conduit and a discharge conduit spaced from the supply conduit to maintain a predetermined level of coffee liquor in the tank. At least one pair, and preferably two or more pairs, of counter-rotating drums are mounted in the tank with the drums being partially immersed in the liquor. The drums in each pair of counter-rotating drums are mounted in close proximity to each other to provide a narrow nip between the counter-rotating drums. Drive means are provided to rotate the drums in a direction toward the nip between the counter rotating pair of drums. A solubilizing bar is mounted tangentially in close proximity to an upwardly rotating section of each of the drums below the level of liquid in the tank to define a gap between the bar and the surface of the adjacent drum, with the gap converging in the direction of rotation of the drum.

Positioned above the dissolving tank is a feeding device including a hopper in which coffee particles, such as granules or powder, are stored, and an inclined vibrating tray from which the particles fall downwardly in a curtain of particles over substantially the full axial length of one of the drums in each pair of counter rotating drums.

A solubilizing filter is mounted in communication with the discharge conduit from the dissolving tank to effect complete dissolution of any powder lumps which may remain in the solution discharged from the dissolving tank. The solubilizing filter comprises a cylindrical screen member formed from a series of wedge-shaped elements secured in adjoining relationships at their bases in close proximity to one another to define a narrow gap between adjacent wedges which becomes increasingly smaller from the apex or upstream end of the wedges to the base or downstream end thereof. Any powder lumps present in the liquor introduced into the solubilizing filter are disintegrated and dissolved by passage through the narrow gap between the base portions of adjacent wedges. The liquor stream discharged from the filter comprises coffee liquor of increased solids content which is free of undissolved lumps of powder, and may be further processed by conventional procedures in the production of soluble coffee products.

In the operation of the apparatus, rotation of the partially immersed drums in the body of liquor in the dissolving tank causes a thin film of the liquor to be carried on the surface of the drums as they emerge from the liquor. Coffee particles from the hopper are discharged from the vibrating tray as a falling curtain of particles onto one of each pair of counter-rotating drums in the dissolving tank, where powder particles are initially wetted by the film of liquor carried on the surface of the drums. Due to the small particle size of the powder and their hygroscopic nature, a portion of the wetted particles tend to form wet powder lumps on the surface of the drum with the lumps having a gummy exterior surface and undissolved powder on the inside. The wetted coffee powder and wet powder lumps are carried on the surface of the drums into the nip between the adjacent counter-rotating drums where the powder lumps are compressed, kneaded and sheared during passage through the nip to break up most of the lumps and more completely wet the coffee powder. The wetted particles passing through the nip are carried into the body of liquor in the dissolving tank upon continued rotation of the drums and dissolve in the liquor to increase the solids content of the coffee liquor. As the drums are rotated past the submerged solubilizing bars, any powder lumps remaining are carried into the converging gap between the periphery of the drum and the solubilizing bar where the powder lumps are abraded against the bars to disintegrate any lumps, with the powder being dissolved in the coffee liquor. Coffee liquor discharged form the dissolving tank has an increased solids content and is substantially free of wet powder lumps.

Any trace amounts of wet powder lumps which may remain in the liquor are removed by passing the liquor discharged from the dissolving tank through the cylindrical solubilizing filter in which the liquor is passed through the converging gap between adjacent wedges. Any wet powder lumps remaining in the liquor are subject to abrading and shearing as they pass through the converging gap to disintegrate and dissolve the lumps in the liquor. Liquor discharged from the solubilizing filter is free of lumps.

The apparatus and method of this invention are effective in dissolving hygroscopic particles, including finely divided coffee powder in cold coffee liquor in a manner in which lumping, foaming and coffee quality degradation are minimized. The temperature of the coffee liquor preferably is maintained in the range of about 5° C. to 15° C. during passage through the dissolving tank, but may range from about 5° C. to 60° C. Higher temperatures may be used but are generally not preferred since higher temperatures are detrimental to coffee quality. Typically the solids content of the coffee liquor is increased by about 3–5% or more, during passage through the dissolving tank.

DESCRIPTION OF THE INVENTION

Figure 1:
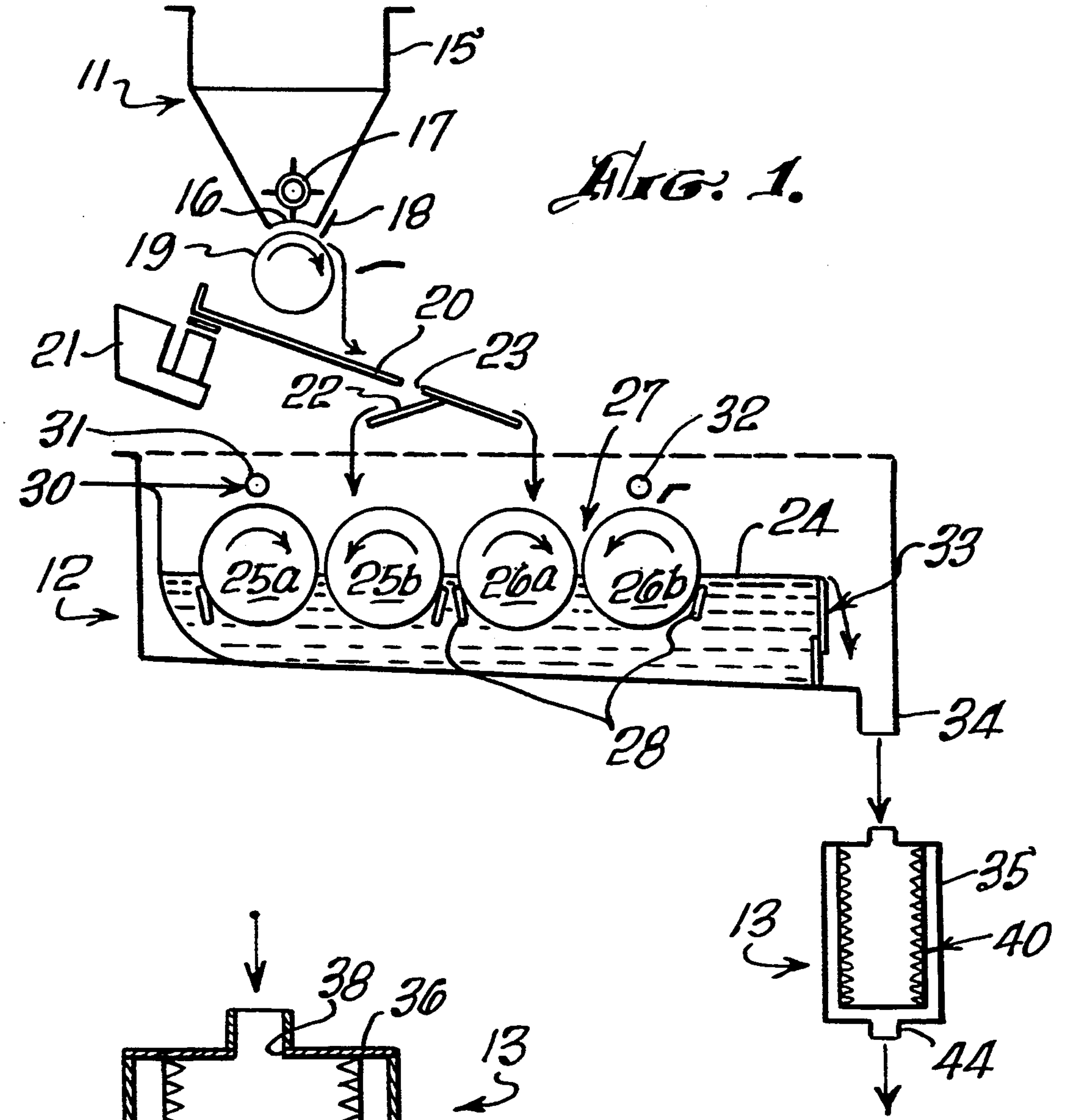
FIG. 1 is a schematic representation of particle wetting and dissolving system of the present invention.

Referring now to FIG. 1, there is illustrated a system for wetting and dissolving hygroscopic coffee particles in coffee liquor. While the invention will be described in particular with respect to dissolving coffee fines which typically have a particle size of less than about 0.5 mm in coffee liquor, it will be understood, that the system and method of this invention may be used in wetting and dissolving other particulate materials in liquids. For example, the system and method of this invention may be used to wet and dissolve regular freeze-dried coffee granules, which typically have particle sizes ranging from about 0.5 to 2.5 mm, produced in commercial freeze drying operations but which for some reason are not commercially acceptable, in coffee liquor. In general, the invention may be used to wet and dissolve hygroscopic particles in an aqueous liquid.

The system of this invention includes a feeding device 11, a dissolving tank 12 positioned below the feeding device, and a solubilizing filter 13 which is mounted in communication with the discharge outlet of the dissolving tank. Feeding device 11 includes a hopper 15 in which the coffee fines are stored. Hopper 15 has an outlet 16 at the base thereof for discharging the coffee fines, and an agitating roller 17 mounted across the hopper, adjacent the outlet, to prevent the coffee fines from packing together in the hopper. In accordance with a preferred embodiment, hopper 15 is rectangular in shape, having a length of about 1 meter. A distributing bar 18 is mounted on the base of the hopper at outlet 16 to facilitate uniform discharge of powdered fines from the hopper. Mounted across the base of the hopper adjacent and below outlet 16 is an elongated metering roller 19, having an axial length which is coextensive with the length of outlet 16, onto which powdered fines discharged from the hopper are deposited over substantially the axial length of the metering roller. Metering roller 19 and agitating roller 17 are driven by a single drive motor (not shown) through conventional sprocket and chain drives to set the powder feed rate to the system.

An inclined powder feed tray 20, which is substantially coextensive in width with the axial length of roller 19, is mounted under metering roller 19 to receive powdered fines discharged from the roller. One or more vibrator units 21 are secured to the underside of the feed tray 20 at the upper or feed end of the tray. In the embodiment illustrated in FIG. 1 a secondary inclined feed tray 22 is secured to the underside of tray 20 adjacent the discharge end of tray 20, with tray 22 extending in a direction opposite to that of tray 20 but at approximately the same angle as that at which feed tray 20 is disposed. A series of openings 23 are provided across the width of feed tray 20, with the openings 23 being spaced apart a distance equal to or slightly greater than the width of the openings 23. In this manner about one-half of the particles falling from metering roller 19 onto tray 20 pass through openings 23 onto secondary feed tray 22 from which they are discharged, while the other one-half of the particles pass between the openings and are discharged from the lower end of tray 20.

Dissolving tank 12, which is in the form of a receptacle adapted to contain a body of liquid 24, such as cold concentrated coffee liquor, is mounted under the lower or discharge ends of trays 20 and 22. At least one pair of counter-rotating drums is mounted in the tank, with the drums extending substantially across the width of the tank and having an axial length substantially equal to the width of the feed tray. In accordance with a preferred embodiment of the invention two pairs of counter-rotating drums **25*a*–25*b* and 26*a*–26*b* are mounted in the tank with the lower portion of each roller being submerged in the body of liquor 24 in the tank. A relatively narrow nip 27 typically on the order between about 6–12 mm in width is provided between the drums in each counter-rotating pair. The pairs of drums are rotated in the directions indicated by the arrows in FIG. 1** by a drive motor (not shown) located outside the tank through conventional gearing so that all of the drums are rotating at the same speed, typically from 5 to 25 rpm. A thin, substantially continuous layer of liquor adheres to the surface of the drums as they are rotated out of the body of liquor, with the liquor layer being retained on the drums as they are rotated through the nip. In accordance with a preferred embodiment, a meshed wire or cloth, such as 6-mesh wire cloth, is mounted on the surface of the drums to facilitate formation and retention of the liquor layer on the surface of the drums.

The pairs of counter-rotating drums are positioned in the tank so that coffee fines discharged from feed tray 20 are deposited on the liquor layer on the-surface of drum **26*a*, and coffee fines discharged from secondary feed tray 22 are deposited on the liquor layer on the surface of drum 25*b*, with the fines being deposited over substantially the axial length of the drums. The particles deposited on the liquor layer of the drums become wetted by the liquor and tend to form wet lumps on the surface of the drums. Continued rotation of the drums carries the wetted particles and lumps through the nip 27**, in which the particles are further wetted and the lumps are compressed, kneaded and sheared to break up the lumps, with the wetted particles then being dissolved in the liquor body.

A solubilizing bar 28 is mounted in close proximity to each of the drums adjacent on upwardly rotating section of the lower half of the drums, with each of the solubilizing bars being submerged in the body of liquor in the dissolving tank 12. Each of the solubilizing bars is mounted tangentially to a drum and extends parallel to and over the entire axial length of the drum to define a converging gap between the solubilizing bar and the adjacent drum which converges the direction of rotation of the drum. This gap, which is on the order of about 3 mm to 6 mm in width at the upper end of the solubilizing bar, serves to compress, abrade, condition and dissolve powder lumps present in the body of liquor in the tank. The solubilizing bar may be a solid plate or may be provided with a series of perforations extending across the bar.

Liquid, preferably cold concentrated coffee liquor such as, for example, coffee liquor having a solids content of about 35%–45% and a temperature of about 5° C. to 15° C., is pumped to dissolving tank 12 in inlet conduit 30 and carried to distribution pipes 31, 32 in the tank. Distribution pipe 31 is mounted above drum *25a* over the length of the drum and has a series of openings along its length which uniformly distribute inlet liquor onto the axial length of the drum. Distribution pipe 32, mounted above drum *26b*, also extends over the length of the drum and also includes a series of openings which distribute the inlet liquor onto the axial length of drum *26b*. A flow meter (not shown) preferably is provided in inlet conduit 30 to measure and control the rate of liquor flow into the dissolving tank.

An adjustable flow gate 33 is mounted across the width of dissolving tank 12 adjacent one end thereof to maintain a predetermined level of liquor in the tank. Preferably the liquor level in the tank is maintained at or slightly below the horizontal center of the drums. A liquor discharge conduit 34 is secured to the base of discharge tank 12 at the end of the tank adjacent the flow gate 33 to receive liquor which flows over gate 33.

Figure 2:
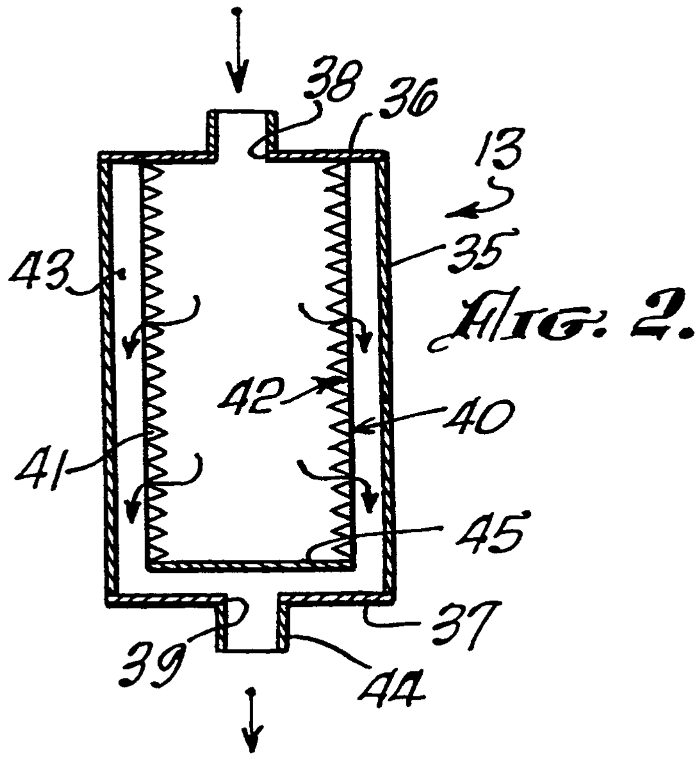
FIG. 2 is a sectional view of the solubilizing filter used in the wetting and dissolving system of this invention.

Concentrated liquor containing dissolved coffee fines discharged from tank 12 is carried through conduit 34 to solubilizing filter 13 in which any wet powder lumps or portions of such lumps remaining in the liquor are abraded, sheared and dissolved. Referring now to FIG. 2, it can be seen that solubilizing filter 13 includes a cylindrical shell 35 closed at its top and bottom ends by caps 36 and 37 respectively, with both of the caps having an opening 38, 39 extending therethrough. Conduit 34 is secured to cap 36 at opening 38 to introduce concentrated liquor discharged from tank 12 into solubilizing filter 13. Mounted concentrically within shell 35 is a tubular filter 40 which comprises a plurality of metal wedges 41 secured in close proximity to each other at the base of the wedges in a coplanar relationship and formed into a cylinder, with the base of the wedges forming the outer surface of the cylinder and the apex of the wedges forming the inner surface of the cylinder. As shown in FIG. 2, a converging gap 42 is formed between adjacent wedges, with the gap having a width of about 0.075 mm to 0.20 mm at the base of the wedges. The filter 40 is secured at its upper end to the inner surface of cap 36 and is closed at its lower end by plate 45. Concentrated liquor from dissolving tank 12 introduced into the interior of tubular filter 40 flows outwardly through the converging gap 42 between adjacent wedges 41 of the filter into annular chamber 43 provided between the filter and cylindrical shell 35 from which it is discharged through conduit 44. As the liquor flows through the narrow, converging gap 42 any wet powder lumps present in the liquor are compressed, abraded, sheared and dissolved in the liquor. The liquor discharged from solubilizing filter is free of wet powder lumps and is used in further conventional processing operations, such as freeze drying or spray drying of the coffee liquor to produce soluble coffee products.

A typical operation of the system will now be described to illustrate the practice of this invention in which coffee fines are dissolved in low temperature concentrated coffee liquor in the system illustrated in FIG. 1. Because of its viscous nature, the concentrated liquor tends to produce very foamy, partially dissolved solutions when used in prior wetting and dissolving systems for the recovery of coffee fines.

In this exemplary embodiment, concentrated coffee liquor having a solids content of between 39% to 41% and a temperature of about 8° C. to 10° C. is pumped into dissolving tank 12 via inlet conduit 30 and distribution pipes 31 and 32 from which the liquor is sprayed onto the surfaces of rotating drums *25a* and *26b*. Flow gate 33 is positioned so as to maintain the liquor level in the tank slightly below the horizontal midpoint of the drums. The drums, each of which has a diameter of 15.24 cm and an axial length of about 1 m, are positioned so that the nip 27 between counter-rotating drums is 9.5 mm. Rotation of the drums in the body of liquor in the tank causes a thin layer of liquor to adhere to the surface of the drum as it is rotated out of the liquor body, with the liquor layer being retained on the drum surface as it passes through nip 27.

Coffee fines having an average particle size of 75 to 120 microns, stored in hopper 15, are discharged onto metering roller 19, which is rotating at about 3 rpm, to provide a powder feed rate to the system of about 54 kg per hour, and onto vibrating feed tray 20. Openings 23, which extend across the width of the feed tray, are about 10 mm in diameter, separated by a distance of about 15 mm, so that about one-half of the coffee fines moving down tray 20 fall through the openings onto secondary feed tray 22 while the remaining coffee fines pass between the openings and are retained on tray 20. The coffee fines are discharged from the ends of trays 20 and 22 as a falling curtain of particles onto the layer of liquor on the surface of drums *25b* and *26a* over substantially the axial length of the drums. Upon contact with the liquor layer, the particles become wetted. Due to the hygroscopic nature of coffee fines, the wetted particles tend to form wet sticky lumps on the surface of the drums. Continued rotation of the drums in the direction of the arrows shown in FIG. 1, carries the particles into the nip 27 between the adjacent counter-rotating drums where the wet lumps are compressed, kneaded and sheared to break up most of the lumps.

The wetted particles and remaining lump portions are carried into the liquor body by continued rotation of the drums where substantially all of the particles are dissolved in the liquor. Wet lumps of undissolved coffee fines which remain in the liquor are carried into the converging gap between the drums and solubilizing bars 28. As the wet powder lumps pass through the narrow gap (about 5 mm) they are compressed and abraded to break, condition and dissolve substantially all of the wet lumps. Coffee liquor which flows over flow gate 33 and is carried away from tank 12 typically has a solids content of about 3% to 5% or more greater than that of the liquor supplied to the tank, while the temperature of the liquor is increased only a few degrees during passage through the tank.

The liquor leaving tank 12 is pumped to filter 13 in which it flows through tubular filter 40 which is formed of wedges having a gap of about 0.076 mm to 0.15 mm between the base of adjoining wedges. Any minor amounts of wet lumps which may be present in the liquor are abraded, sheared and dissolved as the liquor flows through the gaps in the wedge filter. Concentrated coffee liquor discharged from filter 13 is pumped to a holding tank for subsequent processing in producing dried soluble coffee.

The timing of all drums and rollers in the system is controlled by gearing in which a single drive motor drives all of the drums and rollers through sprocket and chain drives. The positioning and timing of the various gears is within the skill of those in the machine art.

Thus, the present invention provides a system and method for wetting and dissolving coffee fines in cold concentrated coffee liquor in which foaming, the presence of wet lumps in the liquor and coffee quality degradation are avoided.

What is claimed is:

1. A method for wetting and dissolving finely divided dry particles in a liquid which comprises, establishing a body of liquid in a tank, mounting at least one pair of counter-rotating drums in the tank, with the drums being partially submerged in the body of liquid and the drums in each counter-rotating pair being mounted parallel and in close proximity to one another to define a nip between the counter-rotating drums, rotating the drums so that both drums in each counter-rotating pair are rotated in a direction toward said nip, with a layer of the liquid adhering to the surface of each drum as it rotates out of said body of liquid, depositing a layer of dry particles on the liquid layer on the surface of a rotating drum in each counter-rotating pair whereby the particles are wetted and form wet powder lumps on the surface of the drums, carrying the wetted particles and wet powder lumps on the surface of the drums through said nip, to compress, knead and break up substantially all of the powder lumps, and into the body of liquor to dissolve the wetted particles therein, rotating each of said drums into a converging gap provided by a stationary bar mounted in the liquid body tangential to an upwardly rotating section of the drums whereby substantially all of the wet powder lumps are abraded and disintegrated during passage through said converging gap and are dissolved in said liquid, removing the liquid solution containing dissolved particles from the tank, passing the liquid removed from the tank through a plurality of converging gaps in a cylindrical filter whereby any remaining powder lumps in the liquid are abraded, sheared and disintegrated by passage through the gaps with the particles being dissolved in the liquid, and discharging from said filter liquid which is free from powder lumps.

2. The method defined in claim 1 in which the dry particles comprise coffee fines having an average particle size of about 75 to 120 microns.

3. The method defined in claim 2 in which the liquid is concentrated coffee liquor having a solids content of about 25% or more and a temperature of about 5° C. to 60° C., with the solids content of the liquor being increased by about 3% to 5% or more and the temperature of the liquor being increased by about less than 10° C. during the period the liquor remains in said tank.

4. The method defined in claim 1 in which two pair of counter-rotating drums are provided in the tank, with the powder particles being deposited on one of each pair of drums, so that the wet powder lumps formed on the surface of the drums are carried into the nip of both pairs of rollers to compress, knead and break up powder lumps in both sets of drums.

5. The method defined in claim 1 in which the liquid removed from the tank is passed through converging gaps having a width of from about 0.075 mm to 0.20 mm.

* * * * *